Patented Dec. 3, 1935

2,023,087

UNITED STATES PATENT OFFICE 2,023,087

PRODUCTION OF BUTYL ALCOHOL BY FERMENTATION

Winfred N. McCutchan and Cornelius F. Arzberger, Peoria, Ill., assignors to Commercial Solvents Corporation, Terre Haute, Ind., a corporation of Maryland No Drawing. Application November 28, 1932, Serial No. 644,692

12 Claims. (Cl. 260—135)

The present invention relates to the production of butyl alcohol and other valuable products by the fermentation of carbohydrate-containing mashes. More particularly, the present invention relates to the utilization in a subsequent fermentation of products from a previous butyl alcohol fermentation.

It is well known that butyl alcohol, together with other products such as ethyl alcohol and acetone and/or isopropyl alcohol may be produced by the fermentation of carbohydrate mashes by means of butyl alcohol producing organisms such as B. amylobacter, Clostridium acetobutylicum (Weizmann), etc. For example, the common commercial method for the production of butyl alcohol by fermentation consists in subjecting a starch mash such as maize mash to the action of Clostridium acetobutylicum (Weizmann). The average mash for this type of fermentation contains from 5 to 10% of carbohydrate, and at the completion of the fermentation there always remains a small percentage, for example from 0.25 to 1.00% of unfermented carbohydrate material, together with a certain amount of metabolic by-products, cell degradation products, etc. This material remains as a dilute solution or suspension after the solvents have been recovered by distillation, and is commonly known as "slop". It varies somewhat in composition depending upon the concentration and character of the carbohydrate employed in making up the mash, the completeness of the fermentation, etc.

The disposal of this slop has presented a problem which has hitherto been unsolved, its disposal as sewage presenting a particularly serious problem since even after the removal of the greater portion or all of its low solid content the "biological oxygen demand" of the slop from a single fermentation plant often far exceeds that of the domestic sewage of a large city. Other methods of disposal also possess certain obvious disadvantages.

Previously, it had never been thought possible to utilize the slop in making up mash for subsequent fermentations in view of the well known inhibitory effect of the metabolic by-products of the growth of micro-organisms upon subsequent growth of the same organisms. This effect has been termed "isantagonism" by Eijkman (Zentralblatt für Bakteriologie, Parasitenkunde und Infektionskrankheiten, Abteilung I, 35, 1–3) and has been noted by numerous bacteriologists as applying to various types of bacteria. It has been shown, for example, to apply to Bact. coli, Bact. typhosum, Micrococcus ovalis, Vibrio cholerae, Vibrio metchnikovii, Pseudomonas fluorescens, and Bact. dysenteriæ (Eijkman, loc. cit.; Rahn, Zentralblatt für Bakteriologie, Parasitenkunde und Infektionskrankheiten, Abteilung II, 16, 417; Upton, Journal of Bacteriology 17, 315; Lal, Indian Journal of Medical Research, Calcutta, 8, 731).

In a co-pending application, U. S. Serial No. 644,691, filed November 28, 1932, by David A. Legg for "Fermentation process", the surprising discovery has been reported that in the butyl alcohol fermentation the slop can be utilized not only in the succeeding fermentation, but successively for a plurality of times. It is apparent that when the slop is thus re-used in the process a number of decided advantages ensue. For example, it is possible to utilize somewhat higher concentrations of carbohydrate material in the mash since any unfermented material may in this way be again subjected to the action of the bacteria instead of thrown away as in previous methods of conducting the process. Water and steam consumption are materially reduced. The unfermentable solid content of the slop is built up to a concentration which makes disposal feasible either by sewage disposal processes or by recovering the solid matter by evaporation or the like. It has further been found that the re-use of slop surprisingly reduces the foaming frequently present in the fermenters, thus making possible the use of a larger amount of mash in each vessel. The latter advantage in itself amounts to a considerable economic advantage, since the amount of solvents produced per unit of equipment is materially increased. In addition to these advantages, there is secured in some cases a marked increase in yield which of course makes the process even more desirable from an economic standpoint.

It has also been discovered that when slop is re-used in the butyl fermentation process improved results are obtained by utilizing cultures which have been "acclimated" to the presence of slop. Such cultures may be prepared, for example, by sub-cultivating in successive mashes containing increasing amounts of slop. By the use of such cultures slop may be employed in concentrations up to several hundred percent, i. e., it may be reused a number of successive times in making up mash, with marked improvement in yield. Under the same conditions, the use of normal un-acclimated cultures secures good fermentation, with most of the advantages enumerated above, but does not in general secure the improved yield obtained with the acclimated cultures.

It has now been discovered that even higher concentrations of slop, i. e., a more extended re-cycling, can be employed if at least a portion of the suspended solids are removed from the slop in such amounts as to leave a readily mobile mash. This may be accomplished in any convenient manner such as filtering or settling and may be effected either after successive fermentations or in some cases preferably only after having re-cycled the slop several times, say about three times. In this manner, slop can be re-cycled satisfactorily ten, or more, successive times, securing good and even improved yields. and at the same time building up a relatively high concentration of soluble unfermentable solids.

In the reuse of slop and particularly in the case of the reuse of filtered slop, it has been found advantageous to at least partially neutralize the slop before recycling, this step in most instances having been found to increase materially the yields and otherwise give generally more satisfactory results.

While the process of the present invention may be said to be applicable to the butyl fermentation industry generally, it is especially applicable to be employed in conjunction with the fermentation of starch mashes by means of Clostridium acetobutylicum (Weizmann). For purposes of illustration, therefore, the following specific examples will deal with this fermentation. The slop obtained from the fermentation of a maize mash by this type of bacteria is a turbid liquid, somewhat acid in reaction, having a solid content of about 1%. The acidity usually ranges from 2.0 to 4.0 c. c. of N/10 acid per c. c. of slop, this acid consisting principally of volatile acids such as acetic and butyric together with appreciable amounts of non-volatile acids. The following is an approximate analysis of a representative sample of such slop obtained by the fermentation of a 7.25% degerminated maize mash:

Total dry matter _____ 2.27 gm. per 100 cc.
Soluble matter _____ 0.732 gm. per 100 cc.
Insoluble matter _____ 1.537 gm. per 100 cc.
Composition of dry matter:
Proteins _____ 0.0%
(All hydrolyzed)
Polypeptides _____ 16.0%
Amino acids _____ 24.0%
Dextrin, sugars _____ 42.0%
Ash _____ 12.0%
Ammonium salts _____ Trace

*Example I*

An 8% maize mash was prepared and fermented in the usual manner, (as for example by the methods disclosed in U. S. Patents Nos. 1,315,585; 1,385,888; 1,668,814; 1,818,782; 1,875,536; etc.). After recovery of the solvents by distillation the slop was filtered and the filtrate used to prepare the mash for the succeeding fermentation. This procedure was then repeated throughout a series of ten successive fermentations so that in the last fermentation of the series the slop concentration was 1000%. The average of a number of fermentations showed an increase in yield in the slop-containing mashes of about 0.7% over parallel fermentations containing no slop.

*Example II*

The procedure followed in Example I was du-plicated except that a third series of parallel fermentations was included, in which slop was re-cycled and in which the resulting mash was in each case neutralized with NaOH or hydrated lime to approximately the pH (5.0 to 6.8) of the parallel mash containing no slop. The average of a number of fermentations showed an increase in yield of the neutralized slop-containing mashes over the un-neutralized of about 0.85% on the weight of the maize and an increase of about 1.5% on the weight of the maize over the mashes containing no slop. No appreciable difference in the relative yields was noted between the first and tenth fermentations of the series.

It is definitely understood that the above examples are illustrative only, and do not in any way limit the scope of this invention. Butyl alcohol producing organisms other than Clostridium acetobutylicum (Weizmann) may be employed, and the mashes may be varied in any way known to those skilled in the art. The concentrations of slop utilized may be varied within considerable limits without departing from the concept of the invention. When utilizing filtered slop, it is preferred to use concentrations between 10% and 1000% but higher concentrations can usually be employed without ill effects. It is understood, of course, that when the slop concentration is referred to in percent, both here and in the appended claims, this concentration may be attained in the usual manner of recycling the slop, or it may be obtained by other means, such as the use of slop concentrates. Also, when filtered slop is referred to, it is understood that the usual equivalents, such as settled slop or centrifuged slop are intended.

With regard to the partial neutralization of the slop, it is understood that this may be accomplished by means of any of the customary known neutralizing agents but it is naturally preferred to use only such as have or produce no particularly toxic effect upon the microorganism employed to bring about the fermentation. Also, the slop or the resulting mash may be neutralized to any point such that the pH of the mash is within the operative range for the particular organism used. It is preferred, however, to adjust the pH of the slop-containing mashes to approximately that of the corresponding mash containing no slop.

With regard to the acclimation of cultures, it is to be understood that the particular method cited herein is not to be taken as limiting the invention. Any method may be employed which brings the culture successively in contact with increasing concentrations of slop.

It is understood also that rye, wheat and other forms of starchy carbohydrates may be used as well as maize. Likewise, saccharine carbohydrates, such as blackstrap molasses, hydrol, invert sugars, glucose, etc., may be substituted for a part or all of the starchy carbohydrate employed in making up the mash. In general it may be said that the use of equivalents, and the use of such modifications of procedure as would naturally occur to one skilled in the art are to be considered as included within the scope of this invention.

The invention now having been described, what is claimed is:

1. In a process for the production of butyl alcohol by the action of butyl alcohol-producing bacteria on a fermentable carbohydrate mash, the improvement which comprises incorporating in such mash filtered distillation slop from a previous fermentation by said bacteria and fermenting the resulting mixture.

2. In a process for the production of butyl alcohol by the action of butyl alcohol-producing bacteria on a fermentable carbohydrate mash, the improvement which comprises incorporating in such mash filtered distillation slop from a previous fermentation by said bacteria, adjusting the initial pH of the resulting mash within the operative range for the said bacteria and fermenting the resulting mixture.

3. In a process for the production of butyl alcohol by the action of butyl alcohol-producing bacteria on a fermentable carbohydrate mash, the improvement which comprises incorporating in such mash filtered distillation slop from a previous fermentation by said bacteria, adjusting the initial pH of the resulting mash to between 5.0 and 6.8 and fermenting the resulting mixture.

4. In a process for the production of butyl alcohol by the action of butyl alcohol-producing bacteria on a fermentable carbohydrate mash, the improvement which comprises incorporating in such mash from 10% to 1000% of filtered distillation slop from a previous fermentation by said bacteria and fermenting the resulting mash.

5. In a process for the production of butyl alcohol by the action of Clostridium acetobutylicum (Weizmann) on a fermentable carbohydrate mash, the improvement which comprises incorporating in such mash filtered distillation slop from a previous fermentation by said bacteria and fermenting the resulting mixture.

6. In a process for the production of butyl alcohol by the action of Clostridium acetobutylicum (Weizmann) on a fermentable carbohydrate mash, the improvement which comprises incorporating in such mash from 10% to 1000% of filtered distillation slop from a previous fermentation by said bacteria and fermenting the resulting mixture.

7. In a process for the production of butyl alcohol by the action of Clostridium acetobutylicum (Weizmann) on a fermentable carbohydrate mash, the improvement which comprises incorporating in such mash from 10% to 1000% of filtered distillation slop from a previous fermentation by said bacteria, adjusting the initial pH of the resulting mash within the operative range for said bacteria and fermenting the resulting mixture.

8. In a process for the production of butyl alcohol by the action of Clostridium acetobutylicum (Weizmann) on a fermentable carbohydrate mash, the improvement which comprises incorporating in such mash from 10% to 1000% of filtered distillation slop from a previous fermentation by said bacteria, adjusting the initial pH to between 5.0 and 6.8 and fermenting the resulting mixture.

9. In a process for the production of butyl alcohol by the action of butyl alcohol-producing bacteria on a fermentable carbohydrate mash, the improvement which comprises incorporating in such mash filtered, at least partially neutralized, distillation slop from the primary distillation of a previous fermentation by said bacteria and fermenting the resulting mixture.

10. In a process for the production of butyl alcohol by the action of Clostridium acetobutylicum (Weizmann) on a fermentable carbohydrate mash, the improvement which comprises incorporating in such mash filtered, at least partially neutralized, distillation slop from the primary distillation of a previous fermentation by said bacteria and fermenting the resulting mixture.

11. In a process for the production of butyl alcohol by the action of butyl alcohol-producing bacteria on a fermentable carbohydrate mash, the improvement which comprises incorporating in such mash filtered distillation slop from a previous fermentation by said bacteria and fermenting the resulting mash with a culture of said bacteria previously grown for a plurality of generations in the presence of such slop.

12. In a process for the production of butyl alcohol by the action of Clostridium acetobutylicum (Weizmann) on a fermentable carbohydrate mash, the improvement which comprises incorporating in such mash filtered distillation slop from a previous fermentation by said bacteria and fermenting the resulting mash with a culture of said bacteria previously grown for a plurality of generations in the presence of such slop.

WINFRED N. McCUTCHAN.
CORNELIUS F. ARZBERGER.